Dec. 1, 1970 A. L. ROBBA 3,544,196
ANTIGLARE CONTRIVANCE WITH THE PROPERTY OF
DIFFRACTION, BIFURCATION AND
POLARIZATION OF LIGHT RAYS
Filed July 5, 1968
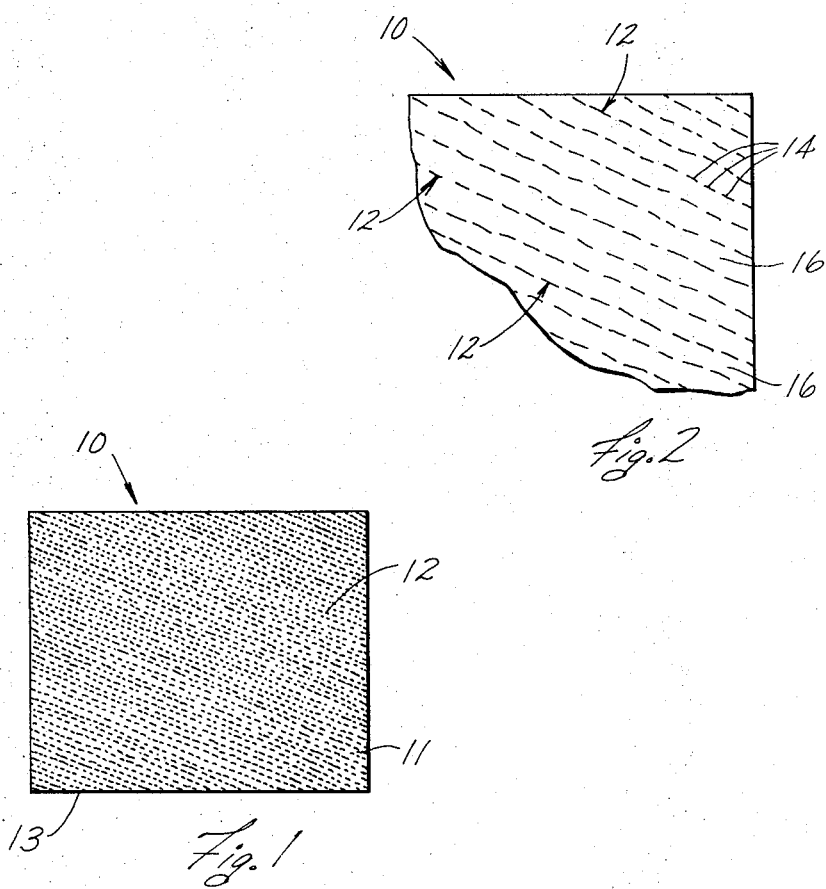
INVENTOR.
ARMANDO LUIZ ROBBA
BY
ATTORNEYS

United States Patent Office 3,544,196
Patented Dec. 1, 1970

3,544,196
ANTIGLARE CONTRIVANCE WITH THE PROPERTY OF DIFFRACTION, BIFURCATION AND POLARIZATION OF LIGHT RAYS
Armando Luiz Robba, Al. Ribeiro da Silva 877,
Sao Paulo, Brazil
Filed July 5, 1968, Ser. No. 742,939
Claims priority, application Brazil, July 7, 1967,
191,112
Int. Cl. G02b 27/28
U.S. Cl. 350—156                     3 Claims

ABSTRACT OF THE DISCLOSURE

An antiglare device for permitting the human eye to have substantially perfect visability without glare when exposed to a light source. The device is characterized by a substantially flat, transparent sheet having substantially parallel surfaces thereon. One of the surfaces has a plurality of substantially parallel lines formed thereon, such as by chemical etching, with the lines extending diagonally substantially at a 22 degree angle. Each of the lines is comprised of a plurality of line segments which are of a predetermined thickness and are spaced from one another by a predetermined distance so as to result in the device having the properties of diffraction, bifurcation and polarization of light rays.

FIELD OF THE INVENTION

The present invention relates to an antiglare contrivance with the property of diffraction, bifurcation and polarization of light rays.

BACKGROUND OF THE INVENTION

The invention relates to a contrivance of real advantage and great efficiency which, when placed between the human eye and a headlight or other light source, permits substantially perfect visability without producing a glare which causes momentary blindness.

For protection against the glare from a light source, such as from the upper beam of automobile headlights, various solutions and devices have been tried so as to effectively reduce the glare. Some of the devices tried on automobiles have consisted of automatic or manual apparatuses which cause a reduction or a change in the direction of the light beams during the crossing of one vehicle with another vehicle. Another prior known device has involved the installation of a bluish or other colored windshield so as to reduce the glare. However, such a device is extremely complicated, expensive and difficult to use. Still another device to reduce glare has involved the use of special glasses having colored and partially opaque lenses that repell the light rays. However, these devices are also not entirely satisfactory. While some of these devices have substantially reduced or eliminated reflections and halos, which are the principal causes of glare, the devices are unsatisfactory since they absorb a large portion of the light and consequently substantially reduce the visability therethrough.

The device or filter of the present invention consists of a network of fine, parallel lines extending diagonally at an angle of approximately 22 degrees with the lines being applied by a suitable process on a flat sheet of transparent material, which sheet is white or colored and has substantially parallel surfaces. The lines, which are colored or opaque, may be applied on the sheet by being graved or etched thereon, such as by a chemical process.

The parallel lines forming the network are each composed of a plurality of line segments which do not practically obey and rigorous exactness, rather being drawn in an irregular manner. To obtain a technical and scientific result, the segmented lines have a predetermined thickness and are spaced by a predetermined distance of preferably one millimeter apart.

The segmented lines which form the network or filter are disposed in an inclined or diagonal sense on a square or rectangular sheet of the material. The lines are preferably inclined at an angle of approximately 22 degrees and extend from the upper left-hand corner of the sheet to the lower right-hand corner of the sheet of material. The lines are preferably segmented and not of exact straightness in order to obtain a better polarization of light.

The device or filter of the present invention has the property of causing diffraction of light rays by decomposing or deviating the luminous rays so as to diminish the light intensity and thereby anulling the glare. The device also causes a bifurcation by dividing the light rays in two. The device further causes a polarization of the light rays which, with the bifurcation, eliminates the light halo and reduces the light into two beams reflected in opposite directions.

The antiglare device or filter is thus highly desirable since it has the ability to (1) eliminate the glare caused by a light source or a headlight and therefore avoid the effects of momentary blindness, (2) eliminate the halo and guide the light rays in two beams of light in substantially opposite directions relative to the direction of the lines traced on the filter, that is, in a direction which is substantially transverse to the extending direction of the lines, and (3) polarize the light by making two luminous beams which are reflected into space.

Thus, the antiglare device or filter according to the invention may be made in the form of eyeglasses or as an attachment for eyeglasses. The present invention is equally applicable to transparent, white or colored glass or plastic and the device may take the form of a visor or lampshade. The present invention is also equally applicable to automobile windshields so as to substantially eliminate glare and the problem of momentary blindness caused when the driver directly faces the light beams of a vehicle coming in the opposite direction. Obviously, the elimination of glare and momentary blindness is highly desirable since it substantially eliminates one potential cause of serious automobile accidents.

Other objects and purposes of the invention will be apparent to persons acquainted with apparatuses of this general type upon reading the accompanying specification and inspecting the accompanying drawings.

BRIEF DESCRIPTION OF THE DRAWINGS

FIG. 1 illustrates an antiglare device according to the present invention.

FIG. 2 is an enlargement of the upper right-hand corner of FIG. 1 and illustrating the network of lines which form the filter.

SUMMARY OF THE INVENTION

The objects and purposes of the present invention are met by providing a sheet of transparent or substantially transparent material, such as of glass or plastic, with the sheet having a network of substantially parallel, diagonally extending lines graved or etched thereon. Each of the lines is preferably composed of a plurality of short line segments which are formed in an irregular manner. The lines are preferably spaced approximately one millimeter apart so as to cause a diffraction, bifurcation and polarization of light rays.

DETAILED DESCRIPTION

FIG. 1 illustrates therein an antiglare device according to the present invention, which antiglare device is indicated generally by the reference numeral 10. As illustrated in FIG. 1, the device comprises a thin sheet of transparent material 11, here shown as rectangular. The sheet of material is flat and has substantially parallel opposite sides. The material, which may be either glass or plastic, such as a sheet of acrylic material, is transparent or substantially transparent and generally has a thickness of between one millimeter and six millimeters, preferably having a thickness of between approximately two millimeters and five millimeters. While the sheet of transparent material is generally white or clear, it could also be colored if desired.

The sheet of material 11 has formed thereon a network of substantially parallel and colored fine lines 12 which extend diagonally of the sheet. Each of the lines have an inclination of approximately 22 degrees relative to the lowermost edge 13 of the sheet.

As diagrammatically illustrated on an enlarged scale in FIG. 2, each of the lines 12 comprises a plurality of individual short line segments 14 which are approximately aligned but spaced from one another. The plurality of line segments 14 are preferably positioned on the sheet 11 in an irregular manner and do not have to be exactly straight or in parallel relationship with the other line segments on the sheet. However, all of the line segments 14 which comprise each of the lines 12 substantially form a straight line with the individual straight lines 12 being substantially parallel. Further, as illustrated in FIG. 2, the lines 12 are preferably spaced apart by a distance 16 of approximately one millimeter.

The network of lines 12 is preferably formed on the sheet of material 11 by being graved or etched thereon by means of a chemical process, such that the lines 12 constitute narrow grooves formed within the sheet of material with each line 12 comprising a plurality of short segmented grooves in correspondence to the short line segments 14. Lines formed by grooves in the above-described manner substantially function as opaque surfaces so as to cause the desired diffraction, bifurcation and polarization of the light rays. Alternately, the lines could be painted on the sheet of material if so desired. However, formation of the lines by chemical graving is preferred.

Although a particular preferred embodiment of the invention has been disclosed above for illustrative purposes, it will be understood that variations or modifications thereof which lie within the scope of the appended claims are fully contemplated.

The embodiments of the invention in which I claim an exclusive property or privilege are defined as follows:

1. An improved antiglare eyeglass filter for diffracting and polarizing light rays, comprising a substantially flat sheet of thin and transparent material having a pair of opposite flat surfaces thereon, the sheet of material having a thickness of between approximately one and six millimeters and also having first and second substantially transverse longitudinally extending directions, line means formed on one of said surfaces for diffracting and polarizing light rays, said line means comprising a network of substantially but not perfectly straight lines with said lines being substantially parallel and extending substantially diagonally of said sheet of material relative to one of said directions, said lines being spaced from one another by a distance of approximately one millimeter, each of said lines constituting a plurality of individual, fine line segments which are disconnected and spaced from one another in their longitudinal direction, the line segments being opaque and individually having a length which is small relative to the length of the respective line, the plurality of line segments comprising a respective line being formed on the sheet in an irregular and nonstraight manner whereby the resulting line is substantially but not perfectly straight.

2. A filter according to claim 1, wherein the line segments constitute grooves graved or etched on said sheet, and said lines having an inclination of approximately 22 degrees relative to one of said directions.

3. A filter according to claim 2, wherein some of said line segments are nonstraight, wherein some of said line segments are of different lengths, and wherein some of the adjacent line segments within their respective lines are in a nonaligned relationship.

References Cited
UNITED STATES PATENTS

| | | | |
|---|---|---|---|
| 2,458,179 | 1/1949 | Land | 350—156 |
| 3,353,895 | 12/1967 | Emerson | 350—147 UX |
| 3,437,401 | 4/1969 | Siksai | 350—157 X |

DAVID SCHONBERG, Primary Examiner

P. R. MILLLER, Assistant Examiner

U.S. Cl. X.R.

350—147, 167; 351—49